Nov. 25, 1969  C. L. MEREDITH  3,480,066
REINFORCED RUBBER ARTICLES WITH LATEX RUBBERIZED ORGANIC
REINFORCEMENTS AND METHOD OF PREPARING THE SAME
Filed Aug. 3, 1966
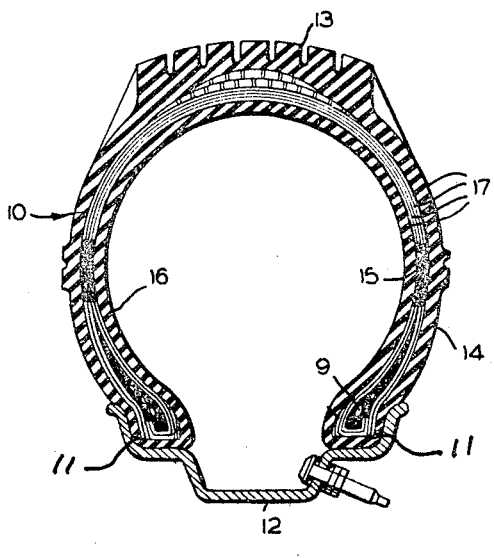
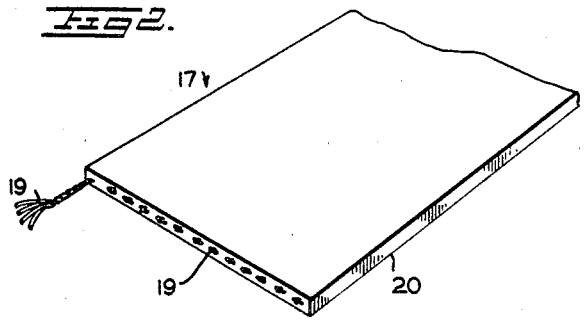
INVENTOR
CURTIS L. MEREDITH
BY Shanley & O'Neil
ATTORNEY

United States Patent Office 3,480,066
Patented Nov. 25, 1969

3,480,066
REINFORCED RUBBER ARTICLES WITH LATEX RUBBERIZED ORGANIC REINFORCEMENTS AND METHOD OF PREPARING THE SAME
Curtis L. Meredith, East Baton Rouge, La., assignor to Copolymer Rubber & Chemical Corporation, a corporation of Louisiana
Continuation-in-part of application Ser. No. 561,310, June 13, 1966. This application Aug. 3, 1966, Ser. No. 569,882
Int. Cl. B60c 5/00; A09j 5/00
U.S. Cl. 152—359          20 Claims

ABSTRACT OF THE DISCLOSURE

The preparation of reinforced elastomeric products in which the reinforcement is treated with a composition containing a phenol aldehyde resin and a latex of a rubbery interpolymer of ethylene, a straight chain monoolefin containing 3–16 carbon atoms and a polyunsaturated bridged ring hydrocarbon in the form of a 5-alkylidene-2-norbornene in which the interpolymer is characterized by reduced specific viscosity of at least 2.2 and an effective unsaturation level of at least 5 carbon-to-carbon double bonds per 1000 atoms.

---

This application is a continuation-in-part of my copending application Ser. No. 561,310, filed June 13, 1966 for Improved Latex, Use Thereof in Rubberizing Organic Reinforcements, and Reinforced Rubber Articles Prepared Therefrom.

This invention broadly relates to a novel synthetic rubber latex and to a method of preparing the same. In some of its more specific aspects, the invention further relates to formulations including the latex of the invention which are especially useful in rubberizing organic reinforcements for rubber articles, and to a method of using the formulations in preparing rubberized organic reinforcements. The invention is also concerned with the rubberized organic reinforcements thus produced, and reinforced rubber articles prepared therefrom.

It is known that elastomes may be prepared by interpolymerizing a monomeric mixture composed of ethylene and at least one higher straight chain alpha monoolefin in solution in an organic solvent and in the presence of a Ziegler polymerization catalyst. However, the resulting saturated elastomers are not sulfur vulcanizable and substances other than sulfur must be used for curing purposes, such as the organic peroxides. Efforts have been made to provide a low degree of ethylenic unsaturation by including a reactive monomeric polyene in the mixture of straight chain alpha monoolefins to be polymerized. The resulting interpolymers usually contain about 3–4 carbon-to-carbon residual double bonds per 1000 carbon atoms, and they may be readily cured with sulfur following prior art practices.

In the interest of simplifying the discussion, the sulfur curable elastomers prepared by interpolymerizing a monomeric mixture containing ethylene, at least one higher monoolefin containing 3–16 and preferably 3–10 carbon atoms, and at least one monomer containing a plurality of carbon-to-carbon double bonds may be referred to herein as ethylene-propylene-diene (EPDM) rubbers, as this represents the presently preferred monomeric mixture. However, when this term is used it is understood that interpolymerizable straight chain monoolefins containing 4–16 and preferably 4–10 carbon atoms may be substituted for at least part of the propylene, and that interpolymerizable polyunsaturated monomers in general which contain a plurality of carbon-to-carbon double bonds may be substituted for all or part of the diene monomer.

The sulfur-curable EPDM rubbers are useful in the preparation of a wide variety of rubber articles, but they have not been entirely satisfactory for use in the manufacture of pneumatic tires for motor vehicles prior to the present invention. For example, pneumatic tires are provided with a carcass member having a plurality of organic reinforcements or tire cords embedded in the rubber and tightly bonded thereto for the purpose of imparting great strength. It has been the practice heretofore to first rubberize the individual tire cords for the purpose of providing a coating of rubber on the surface which will tightly bond thereto, and then employ the rubberized tire cords in the carcass. However, prior art cord dip formulations containing EPDM latex have not been satisfactory for rubberizing tire cords to be used with EPDM rubber in the tire carcass.

In the usual prior art practice, the tire cord is immersed in an aqueous alkaline composition containing a soluble phenol-aldehyde resin and latex of a rubber which is compatible with the rubber in the tire carcass. While this method is satisfactory when the carcass rubber is a highly unsaturated prior art rubber such as natural rubber, cis-1,4-polyisoprene or SBR, and when the cord dip formulation contains natural rubber latex, cis-1,4-polyisoprene latex, SBR latex, or styrene-butadiene-vinylpyridine latex, it is not satisfactory when the carcass rubber contains EPDM rubber or the cord dip formulation contains EPDM rubber latex due to poor adhesion. For instance, the values obtained by the "H" adhesion test, which is the standard test that is used in the industry to determine how tightly the rubber is adhered to the tire cord, have been too low for practical tire building when EPDM rubber latices are used in the cord dip formulation. As a result, the art has long sought a satisfactory process for rubberizing tire cord with EPDM latex to thereby provide rubberized tire cord which will be compatible with EPDM rubber in the tire carcass.

It is an object of the present invention to provide a novel synthetic rubber latex.

It is a further object to provide a novel formulation for rubberizing organic reinforcements for rubbery polymers which includes the latex of the invention.

It is still a further object to provide a novel method of preparing rubberized organic reinforcements for rubbery polymers, such as tire cords for pneumatic tires.

It is still a further object to provide the improved rubberized organic reinforcements produced by the method of the invention, and reinforced rubber articles prepared therefrom.

Still other objects and advantages of the invention will be apparent to those skilled in the art upon reference to the following detailed description and the examples.

The EPDM elastomers to be emulsified in preparing the latex of the invention are rubbery polymers resulting from the interpolymerization of a monomeric mixture containing ethylene, at least one straight chain alpha monoolefin containing 3–16 and preferably 3–10 carbon atoms, and a polyunsaturated bridged-ring hydrocarbon which is an alkylidene norbornene or alkenyl norbornene, in solution in an organic polymerization solvent and in the presence of a Ziegler catalyst. In general, the basic reaction conditions may be the same as those employed in the prior art for preparing EPDM rubbers, provided that the amount of the 5-alkylidene-2-norbornene or 5-alkenyl-2-norbornene and the polymerization conditions are controlled to produce an EPDM rubber having the unsaturation level and molecular weight discussed hereinafter.

The elastomers must have an unsaturation level of at least 5 and preferably at least 6 or 7, carbon-to-carbon double bonds per 1000 carbon atoms, but a much higher unsaturation level may be present such as 8, 10, 20, 30, 60, 100 or more double bonds per 1000 carbon atoms. In instances where optimum adhesion values are desired, then usually better results are obtained at unsaturation levels of 6–30 or 7–30, and preferably 8–15, double bonds per 1000 carbon atoms. The elastomer must also have a moderately high viscosity, such as a reduced specific viscosity (0.1% in Decalin as measured at 135° C.) of about 2.2–7.0, or for better results about 2.5–5. Best results are usually obtained with elastomers having reduced solution viscosities of 2.8–3.5, and preferably 3.0. The raw Mooney value of the elastomers is preferably within the range of 80–200 ($ML_4$), with better results being obtained at about 90–150 ($ML_4$).

It is preferred that the EPDM elastomer for the latex be prepared from a monomeric mixture containing ethylene, propylene and the alkylidene norbornene or alkenyl norbornene, in proportions to produce a polymer having good elastomeric properties and an unsaturation level of at least 5 carbon-to-carbon double bonds per 1000 carbon atoms. For example, the elastomer may contain chemically bound therein molar ratios of ethylene to propylene varying between about 80:20 and 20:80 and preferably between 70:30 and 55:45, and the alkylidene norbornene or alkenyl norbornene in an amount to provide an unsaturation level such as discussed above. In instances where it is desired to prepare a tetrapolymer, or a polymer containing five or more different monomers, then one or more alpha monoolefins containing 4–16 carbon atoms may be substituted for an equal molar quantity of bound propylene in the above-mentioned monomer compositions. When preparing tetrapolymers, the range of the fourth monomer will normally be about 5–20 mol percent, but smaller amounts may be present such as 1, 2, 3 or 4 mol percent.

The specific alkylidene norbornene or alkenyl norbornene that is employed in the polymerization mixture greatly influences the properties of the latex. The 5-alkylidene-2-norbornenes wherein the alkylidene group contains 1–20 and preferably 1–8 carbon atoms, and the 5-alkenyl-2-norbornenes wherein the alkenyl group contains about 3–20 and preferably 3–10 carbon atoms, usually give better results. It is understood that certain individual monomers falling within these classes perform much better than do others. Examples of specific monomers which are outstanding include 5 - methylene - 2 - norbornene, 5 - ethylidene - 2 - norbornene, 5 - isopropylidene - 2 - norbornene, methylbutenyl norbornenes such as 5-(2-methyl-2-butenyl) - 2 - norbornene or 5 - (3 - methyl - 2 - butenyl) - 2 - norbornene, and 5 - (3,5 - dimethyl - 4 - hexenyl) - 2 - norbornene. Of the foregoing monomers, 5-ethylidene-2-norbornene is much preferred as latex prepared from an elastomer which is the product of the interpolymerization of ethylene, propylene and 5-ethylidene-2-norbornene is in a class by itself in its ability to form an adherent coating of rubbery polymer on the usual types of organic reinforcements for rubber articles.

For some reason which is not fully understood at the present time, elastomers prepared from monomeric mixtures containing ethylene, at least one higher straight chain alpha monoolefin having 3–16 and preferably 3–10 carbon atoms such as propylene, and certain polyunsaturated bridged-ring hydrocarbons such as 5-ethylidene-2-norbornene, have a much more rapid cure rate when cured with sulfur than would be predicted from the actual carbon-to-carbon double bond content. In such instances, the apparently higher unsaturation level is embraced within the term "effective" unsaturation level of the elastomer. As is set out in detail hereinafter, the foregoing elastomers may be analyzed to determine the effective unsaturation level by the consumption of bromine, correcting for the substitution reaction by a kinetic method based on the spectrophotometric method developed by Siggia et al., Anal. Chem. 35, 362 (1963). The effective carbon-to-carbon double bond content per 1000 carbon atoms in the elastomer, which may or may not be equal to the actual carbon-to-carbon double bond content, is calculated from the resulting data to determine the effective unsaturation level. The effective unsaturation level may be, for example, at least 5, and usually about 5–60 carbon-to-carbon double bonds per 1000 carbon atoms in the elastomer. Elastomers having effective unsaturation levels of 6–30 or 7–30, and for better results 8–15, carbon-to-carbon double bonds per 1000 carbon atoms are often preferred.

The polymerization solvent used in preparing the elastomer may be any suitable inert saturated hydrocarbon which is liquid and relatively non-viscous under the reaction conditions, including the prior art solvents for the solution polymerization of monoolefins in the presence of a Ziegler catalyst. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene or toluene; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interference with the Ziegler catalyst.

Catalysts in accordance with the prior art may be used in preparing the EPDM elastomer. In general, any suitable prior art Ziegler-type catalyst may be used which is known to produce a satisfactory elastomer. Ziegler catalysts and suitable polymerization processes are disclosed in a large number of issued patents, such as U.S. Patents Nos. 2,933,480, 3,093,620, 3,093,621, 3,211,709 and 3,113,115. Examples of Ziegler catalysts includes metal organic coordination catalysts prepared by contacting a compound of a metal of Groups IVa, Va, VIa and VIIa of the Mendelejeff periodic chart of the elements, as typified by titanium, vanadium and chromium halides, with an organometallic compound of a metal of Groups I, II or III of the Mendelejeff periodic chart which contains at least one carbon-metal bond, as typified by trialkyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually 1 mol of vanadium oxychloride for each 4–10 mols of the alkyl aluminum sesquichloride, to thereby give an aluminum to vanadium gram atomic weight ratio of 8:1 to 20:1.

The polymerization may be carried out in accordance with prior art practices, such as in a dry reaction vessel closed to the outside atmosphere which is provided with temperature control means, an agitator, conduit means for supplying the monomers and catalyst, and conduit means for withdrawing the resulting solution of polymer. The polymerization reaction is carried out in liquid phase in the organic polymerization solvent, and in the presence of the Ziegler catalyst.

The resulting solution of elastomer in the polymerization solvent is withdrawn from the reaction vessel, and the catalyst is killed by addition of a polar compound such as methanol or water, followed by removing the catalyst residue. The resulting solution of elastomer may be used in preparing the latex. If desired, the organic polymerization solvent may be removed to obtain the solid elastomer, and an organic solvent solution prepared from the solid elastomer. The solid elastomer may be conveniently recovered by injecting the solution of elastomer below the liquid level of a body of boiling water, which is maintained in a vessel to which steam is supplied. The resulting elastomer crumb is removed as a slurry from the vessel, and the polymerization solvent is recovered overhead as a vapor. The polymer crumb may be stripped free of solvent vapor, washed free of catalyst residues, dewatered by means of a shaker screen or other device, and dried in a prior art extrusion dryer or apron dryer.

In preparing the latex of the invention, an organic solvent solution of the above-prepared elastomer is emulsified in the presence of water and an emulsifying agent following prior art procedures. The hydrocarbon solvent is then stripped from the latex, water is evaporated as necessary to provide a desired dry solids content, and the latex is ready for use.

The organic solvent in the solution to be emulsified may be a polymerization solvent such as discussed above. Steam distillable hydrocarbon solvents such as benzene, toluene, etc., are usually preferred as they are readily removed from the latex by steam distillation. However, other volatile normally liquid organic solvents may be used.

The emulsifying agent for use in preparing the latex may be the potassium or sodium soaps of fatty acids and rosin acids. The fatty acid may contain about 14–24 carbon atoms, and preferably about 16–18 carbon atoms. Rosin soaps and soaps of long chain fatty acids such as oleic, palmitic, stearic, lauric and myristic acids are especially preferred. Other emulsifying or surface active agents may be employed such as the sodium alkyl naphthalene sulfonates and nonionic surface active agents. Mixtures of the foregoing emulsifying agents may be used, as well as mixtures of other emulsifying agents of the prior art which are known to be useful in the preparation of latices. A mixture of disodium 4-dodecylated oxydibenzene sulfonate and sodium alkylnaphthalene sulfonate is often preferred. A prior art electrolyte also may be present in the latex, such as potassium chloride, sodium chloride, trisodium phosphate, tripotassium phosphate, potassium pyrophosphate, potassium sulfate, sodium sulfate, sodium borate and lithium chloride. Mixtures of these electrolytes may be used, if desired. Usually, the emulsifier should be present in an amount of about 2–5% by weight of the elastomer, and the electrolyte should be present in an amount of about 0.2–1.5% by weight of the elastomer. However, it is understood that amounts outside of these ranges may be employed when desired as it is only necessary to follow prior art emulsification procedures.

Apparatus which is especially useful in emulsifying the hydrocarbon solution of elastomer includes colloid mills such as the Eppenbach colloid mill, vibrating reed types of emulsifying apparatus in general, apparatus employing rapidly rotating blades such as Waring Blendors, and the like. The resulting latex may be concentrated by evaporation up to about 50–65% total solids content, if desired, or allowed to remain at a relatively low concentration, such as about 15–40% total solids content. The latex thus prepared usually has an average polymer particle size between about 1000 Angstroms and 9000 Angstroms, such as about 2500–3500 Angstroms.

The latex may employed in prior art formulations for rubberizing organic reinforcements for rubbery polymers. It is only necessary to substitute the latex of the invention for the latex previously used to obtain the benefits described herein, and otherwise the formulations need not be changed. The latex is especially useful in phenolaldehyde latex cord dip formulations for use in rubberizing tire cord for pneumatic tires.

Examples of phenolic compounds which may be used in cord dip formulations include the mono and dihydroxybenzenes such as phenol, resorcinol, the various cresols, xylenols, trimethylphenols, and mono or dichlorophenols. Resorcinol is usually preferred. Examples of aldehydes include formaldehyde, substances supplying formaldehyde such as paraformaldehyde, acetaldehyde, propionaldehyde, furfural, and homologs thereof. The ratio of the phenolic compound to the aldehyde is such that the resulting resol resin has substantial water solubility prior to thermosetting. In order to prepare the water soluble phenol-aldehyde resin, a small amount of sodium or potassium hydroxide or other condensing agent may be present in an amount of about .02–.5% by weight based on the reactants, and the pH should be adjusted to about 6.5–13.0, and preferably to about 7.0–11.0. Ammonia or ammonium hydroxide also may be used as the base, if desired.

One cord dip formulation which is especially preferred in practicing the invention may be prepared from the following ingredients:

| Ingredients | Broad range (wt. percent) | Preferred range (wt. percent) |
|---|---|---|
| Elastomer in the latex (dry solids basis) | 1–25 | 5–20 |
| Resorcinol | 0.1–5.0 | 1–3 |
| Formaldehyde | 0.2–3 | 0.3–1.5 |
| Sodium hydroxide | 0.001–0.02 | 0.004–0.015 |
| Ammonium hydroxide (NH$_4$OH) | 0.01–0.1 | 0.02–0.07 |
| Water | 70–95 | 75–93 |

In preparing the above cord dip formulation, the resorcinol and formaldehyde are added to approximately one-half of the water and sodium hydroxide, and the pH is adjusted to between 6.5 and 13, and preferably between 7.0 and 11.0. The resin solution is allowed to age for about 1–40 hours, and preferably about 6–30 hours, at a temperature of about 40–150° F. and preferably 50–100° F. The resulting aged cord dip formulation is then ready for use in rubberizing organic reinforcements.

The above formulation may also contain fillers and reinforcing agents. Carbon black is usually preferred, and the carbon black may be present in an amount of about 2–25 parts by weight, and preferably 2–15 parts by weight for each 100 parts by weight of rubber. Other substances may be present such as conventional compounding ingredients, including sulfur, zinc oxide, accelerators, etc.

Organic reinforcements such as tire cord and the like are coated with the aged latex-resin composition by dipping, brushing, spraying, etc. The latex-coated reinforcements are dried for a short period of time to remove the water and initiate curing in some instances, such as at a temperature of about 200–550° F., and preferably at about 300–500° F., for ten seconds to about thirty minutes, and preferably from about thirty seconds to one minute. Better results are obtained in some instances if the reinforcements are dried under a slight tension. Two or more coatings of the above formulation may be applied when this is desirable.

If desired, the dried, rubberized organic reinforcements may be given an additional coating of rubber by applying an organic solvent solution of the EPDM elastomer. In such instances, the same elastomer that is used in the latex is dissolved in an organic solvent, such as a volatile hydrocarbon containing 5–10 carbon atoms or halogenated hydrocarbon solvent containing 1–5 carbon atoms. The rubberized reinforcement is immersed in the solution or otherwise coated therewith, and then dried. This further coating assures that the surface of the reinforcement is completely coated with the elastomer. When desired, the solution of elastomer may contain carbon black and other compounding ingredients including curing agents such as sulfur and accelerators. The above organic solvent solution of the elastomer may be applied directly to the organic reinforcements as the first coating in some instances, such as when preparing rubberized reinforcements for belts and hoses.

The improved rubberized organic reinforcements of the invention are especially useful in constructing a wide variety of articles from EPDM rubber, including pneumatic tires, belts, air springs, rubber hoses, etc. Prior art practices may be followed when preparing the articles, with the exception of substituting the rubberized organic reinforcements of the invention for those of the prior art. In general, the reinforcements are embedded in the compounded EPDM rubber matrix prior to the curing step, and then the assembly is cured to produce the reinforced rubber article.

The drawings illustrate a pneumatic tire including a carcass member which may be manufactured advantageously from the rubberized organic reinforcements of the invention and EPDM rubber. The tire 10 illustrated in FIG. 1 of the drawings is of the tubeless type and has a cross-section in the form of a generally hollow toroidal member. The terminal portions constitute the beads 11—11, inside of which a plurality of bead-type reinforcements 9 are embedded and molded into the rubber. The outer surfaces of the bead portions 11 are formed of an air sealing layer such as butyl or halogenated butyl rubber to aid in adhesion of the same to the rim 12 when the tire is inflated, and thereby prevent the leakage of air from around the rim. The inner liner 16 is formed of butyl rubber or halogenated butyl rubber. The outer surface of the tire includes tread 13 and sidewalls 14. The carcass 15 is intermediate the inner liner 16 and the tread and sidewalls 13 and 14, and it includes a plurality of layers or plies 17 which have the rubberized organic reinforcements 19 of the invention embedded in the cured layers 20 of the EPDM matrix rubber. Thus, the construction of a pneumatic tire in accordance with the invention is the same as in the prior art with the exception of using the rubberized organic reinforcements of the invention and EPDM rubber.

The organic reinforcements to be treated in accordance with the invention may be in the form of filaments, films, rods, threads, cord, etc. Also, the reinforcements may be prepared from a wide variety of organic textile materials such as cotton, rayon, nylon, polyesters, and the like. The organic reinforcements may be rubberized in accordance with the invention to provide a film of rubber which is tightly adhered to the surface of the reinforcement.

Cotton, rayon and nylon reinforcements may be immersed into the cord dip formulation and rubberized effectively without a pre-treatment. However, it is preferred that polyester reinforcements be pretreated in accordance with prior art practices, and then rubberized. Polyester tire cord may be pretreated with an isocyanate such as methylene-bis-(4-phenyl isocyanate) dissolved in an organic solvent in accordance with German Patent No. 1,093,322, or with polyvinyl chloride dissolved in cyclohexanol or butyl alcohol in accordance with British Patent No. 867,187 or Canadian Patent No. 652,487, or with a 6% water solution of a diglycidyl ether of an aliphatic dialcohol and an aliphatic or heterocyclic amine in accordance with Belgian Patent No. 630,633. The pretreated polyester reinforcements are then rubberized in accordance with the invention.

The reduced specific viscosities for the elastomer which are referred to herein are determined in accordance with the standard practice, and are the values obtained for a 0.1% solution of the elastomer in Decalin, as measured at 135° C.

The foregoing detailed description and the following specific examples are for purposes of illustration only, and are not intended as being limiting to the spirit or scope of the appended claims.

EXAMPLE I

Preparation of elastomers from ethylene, propylene and diene third monomers

A one-half gallon Sutherland reactor was equipped with a high speed, heavy duty, air driven motor, cooling coils, thermometer, temperature regulator, pressure regulator, injection port, and additional openings where monomers, catalysts and solvents were fed to and from the reactor. A tube extended to the bottom of the reactor for the removal of the polymer cement, which was produced on a continuous basis.

The reactor was purged for twelve hours with dry nitrogen and then the temperature was raised from ambient to 60° C. by passing hot water through the coils. The reactor was then flushed with propylene for fourteen minutes. The temperature was lowered to 30° C. and maintained at this temperature throughout the polymerization.

One liter of dried Esso chemical grade hexane was added to the reactor, and propylene was added until the reactor pressure was 42.2 inches of mercury. At this time, 1.3 ml. of a 1.5 molar solution of ethyl aluminum sesquichloride was added as an additional purge for water. The pressure was increased to 61.0 inches of mercury by addition of ethylene, and 8.09 millimoles of 5-ethylidene-2-norbornene was added.

The monomer feeds were stopped and the catalyst components, i.e., a 0.0363 molar solution of vanadium oxytrichloride and a 0.351 molar solution of ethyl aluminum sesquichloride, were fed to the reactor at a constant rate and at an 11:1 aluminum to vanadium ratio until a drop in the reactor pressure was noted. At this time, the gaseous monomers were fed into the reactor through a calibrated rotometer at a rate of 1497 cc. per minute, of which 693 cc. were ethylene and 804 cc. were propylene. The 5-ethylidene-2-norbornene was added as a 0.30 molar solution in hexane at the rate of 2.48 ml. per minute.

The polymerization was controlled by the catalyst pump which added the catalyst on demand as the pressure increased, thereby maintaining 61 inches of mercury pressure throughout the polymerization. When the solution contained approximately 6% polymer, solvent saturated with ethylene under 40 pounds per square inch pressure at room temperature was fed into the reactor at the rate of 27.3 cc. per minute, and the polymer cement was removed continuously. At this time, the ethylene and propylene feeds were adjusted to 331 cc. per minute and 1804 cc. per minute respectively, and the 5-ethylidene-2-norbornene feed rate was adjusted to 3.32 cc. per minute to compensate for the unreacted monomers removed with the cement.

The solution cement as removed from the reactor was fed into a Waring Blendor containing water where it was intimately mixed. The cement was then washed three times with equal volumes of water. The washed cement was stabilized with 0.5 part by weight of SDAO, a product of Naugatuck Chemical Company, which is a sulfur bearing, hindered phenol, and it was fed with nitrogen pressure into a T joint at the bottom of a four-liter container full of hot circulating water. The other end of the T was connected to a steam line and steam was admitted at a rate to superheat the rubber cement. The solvent and unreacted monomers were mostly removed by this procedure, and the rubber crumb was collected on a screen, washed and chopped up in a Waring Blendor. The wet crumb was dried in an oven at 90° C. to give a rubbery terpolymer with an ethylene to propylene molar ratio of about 60:40, and a reduced specific viscosity (0.1% solution in Decalin at 135° C.) of 3.0. The terpolymer was highly unsaturated and had an effective unsaturation level of 10.5 carbon-to-carbon double bonds per 1000 carbon atoms.

The above general procedure was followed in other runs, with minor modifications as noted in Table I hereinafter, in preparing elastomers from diene third monomers including 5-methylene-2-norbornene, 5-ethylidene-2-norbornene, and dicyclopentadiene. The resulting elastomers were then used in preparing latices in accordance with the procedure given below. The reduced specific viscosities and the unsaturation levels therefore are recorded in Table II hereinafter.

The spaced strips were then cured at 298° F. for 40 minutes. The H-adhesion values were determined at about 23° C. by means of a Scott tensile tester using a jaw separation rate of 2" per minute.

The rubber stock formulations used in preparing the strips for making the H-adhesion test was as follows:

TABLE I

| Polymer No. | Activator [1] | Reaction Temperature (°C.) | Continuous Monomer Flow Rates | | |
|---|---|---|---|---|---|
| | | | Ethylene (cc./min.) | Propylene (cc./min.) | Diene (moles/ min.) |
| 1 | MASC [2] | 35 | 329 | 1,725 | $6.34 \times 10^{-5}$ |
| 2 | EASC [3] | 30 | 331 | 1,804 | 10.02 |
| 3 | MASC | 30 | 331 | 1,804 | 9.90 |
| 4 | EASC | 30 | 331 | 1,804 | 9.96 |
| 5 | EASC | 30 | 381 | 2,071 | 9.49 |
| 6 | MASC | 30 | 335 | 2,097 | 10.44 |

[1] The vanadium oxychloride solution was one tenth the concentration of the activator solution.
[2] Methylaluminum sesquichloride, used as a 0.20-0.24 molar solution.
[3] Ethyl aluminum sesquichloride, used as a 0.35-0.39 molar solution.

Preparation of the latices

A benzene solution containing 5.4 weight percent of an elastomer prepared above was emulsified in an Eppenbach colloid mill with an equal volume of an aqueous solution. The aqueous solution contained on a weight basis per 100 parts of rubber: 7.8 parts of a 45% solution of disodium 5-dodecylated oxydibenzene sulfonate, 0.5 part of sodium alkyl naphthalene sulfonate, and 0.3 part of $K_3PO_4$. The benzene solvent was removed by steam distillation at atmospheric pressure to give a solvent-free latex, and water was removed by evaporation to give the desired total solids content in the latex. It was possible to vary the solids content between 18 and 60% total solids content. Latices were prepared from each of the elastomers prepared above, and the resulting latices were used in preparing the cord dip formulations described below.

Preparation of the cord dip formulations

Each of the above latices was used in preparing a resorcinol-formaldehyde cord dip formulation by the following procedure.

In preparing the formulations, 0.1 gram of dry sodium hydroxide was added to 300 ml. of water at 32° C., stirred for 5 minutes, and 12.2 grams of dry resorcinol was added and stirred for 5 minutes. 19.6 grams of formaldehyde (40%) was then added, stirred for 16 minutes, an additional 300 ml. of water was added, and the resulting mixture was allowed to age for 24 hours at room temperature. The resin solution had a pH of 7.5.

100 grams on a dry solids basis of a latex prepared above was added to the resin solution, followed by 16.2 grams of ammonium hydroxide (28%), and sufficient water to make a total of 490 ml. including the water present in the latex. The mixture was blended and stirred for 15 minutes, and used as a latex cord dip following the procedure set out below.

Preparation of rubberized tire cord

The latex cord dip formulations prepared above were used in rubberizing nylon cord (1260/2 nylon). A sample of the nylon cord was immersed into each cord dip formulation, then withdrawn from the formulation and dried at 232° C. (450° F.) for 40 seconds.

A standard H-adhesion test was conducted on each of the samples of rubberized nylon tire cord. The "H" adhesion test is described by Lyons et al., Rubber Chemistry and Technology, page 268, Volume XX (1947). In conducting the test, the rubberized cord was embedded in spaced strips of a compounded but uncured rubber stock formulation. The strips had a width of 3/8", a thickness of 3/16", and the adjacent strips were spaced by about 1/2".

| Ingredient: | Parts by weight |
|---|---|
| EPDM rubber | 100 |
| Zinc oxide | 5.0 |
| Stearic acid | 1.0 |
| Carbon black | 80.0 |
| Processing oil | 47.5 |
| Tetramethylthiuram monosulfide | 1.50 |
| 2-mercapto-benzothiazole | 0.75 |
| Sulfur | 1.50 |

The following data were recorded:

TABLE II

| Polymer No. | Third monomer used in preparing the elastomer | Effective unsaturation level (C=C/1,000 C) | RSV | H-adhesion value (lbs.) |
|---|---|---|---|---|
| 1 | 5-ethylidene-2-norbornene | 8.0 | 2.8 | 23.2 |
| 2 | do | 10.5 | 3.0 | 28.8 |
| 3 | do | 10.6 | 4.0 | 30.0 |
| 4 | do | 11.0 | 3.3 | 26.1 |
| 5 | 5-methylene-2-norbornene | 7.4 | 3.3 | 25.0 |
| 6 | Dicyclopentadiene | 6.0 | 3.4 | 11.5 |

EXAMPLE II

Latices were prepared from two terpolymers having mol ratios of chemically bound ethylene to propylene of 60–65 to 40–35, and containing chemically bound 5-(methyl-2-butenyl)-2-norbornene in varying amounts. One terpolymer contained 5-(methyl-2-butenyl)-2-norbornene chemically bound in an amount to provide an effective unsaturation level of 5.6 carbon-to-carbon double bonds per 1000 carbon atoms and had a reduced specific viscosity (0.1% in Decalin at 135° C.) of 4.0. The second terpolymer contained sufficient chemically bound 5-(methyl-2-butenyl)-2-norborene to provide an effective unsaturation level of 8.7 carbon-to-carbon double bonds per 1000 carbon atoms and had a reduced specific viscosity (0.1% in Decalin at 135° C.) of 3.2. A solution containing 0.1 g. of polymer dissolved in 100 cc. of Decalin was used in this and the other examples herein when measuring the reduced specific viscosity of the polymers.

The latices were prepared by the procedure of Example I, and cord dip formulations were prepared therefrom following the procedure and recipe of Example I.

Nylon cord was rubberized with each cord dip formulation and then tested following the procedures of Example I. The following results were obtained:

TABLE III

| Effective unsaturation level | RSV | H-Adhesion value (lbs.) |
|---|---|---|
| 5.6C = C/1000 C | 4.0 | 21.0 |
| 8.7C = C/1000 C | 3.2 | 24.0 |

The elastomers decribed herein may be analyzed as set out below to determine the effective unsaturation level by the consumption of bromine correcting for the substitution reaction by a differential kinetic method based on the spectrophotometric method developed by Siggia et al., Anal. Chem. 35, 362 (1963). The basis of the method is the determination of the differences in rates of addition and substitution of bromine ($Br_2$) with ethylenically unsaturated linkages. The rate of reaction is determined by monitoring the disappearance of the bromine photometrically as a function of time. A sharp break occurs when the rapid addition reaction to the carbon-to-carbon double bonds is complete and the slow substitution reaction continues. Extrapolation of a kinetic plot (pseudo first order) to a time of "O" will give the amount of bromine remaining after addition to the carbon-to-carbon double bonds was complete. The change in bromine concentration is taken as the measure of the effective unsaturation level in the elastomer.

Materials (1) Bromine solution, 0.0125 molar in $CCl_4$ (2.0 g. of $Br_2$/liter of $CCl_4$).

(2) Aqueous potassium iodide solution containing 10 grams of KI in 100 ml of water.

(3) Mercuric chloride catalyst solution containing 0.2 g. of mercuric chloride dissolved in 100 ml. of 1,2-dichloroethane.

(4) Starch indicator solution.

(5) Aqueous sodium thiosulfate solution, 0.01 normal accurately standarized.

(6) Carbon tetrachloride, reagent grade.

(7) Spectrophotometer (visible range) having sample and reference cells than can be stoppered.

(8) Stopwatch (if a non-recording photometer is used).

Calibration (1) With the standard 0.01 N $Na_2S_2O_3$ solution, titrate to the starch-iodine endpoint duplicate 10.00 ml. samples of the 0.0125 M bromine solution to which 5 ml. of the 10% KI solution and 25 ml. of distilled water have been added.

(2) From the standard 0.0125 M bromine solution, prepare a series of five calibration standards of the following concentrations: 0.5, 1, 2, 3, and 4 millimoles of $Br_2$/liter.

(3) Determine the absorbance in the sample cell of each of the five calibration standards at a wavelength setting of 415 m$\mu$[1] versus $CCl_4$ in the reference cell. Then prepare a plot from the resulting data of absorbance versus the exact concentration of $Br_2$ contained in the calibration standards, plotted as millimoles of $Br_2$/liter to obtain a calibration curve.

(4) Determine the slope of the calibration curve thus obtained for use in the equation:

$Br_2$ in millimoles/liter =

$$\text{Absorbance} \times \frac{1}{\text{slope of calibration curve}}$$

Analysis (1) Dissolve about 1.25 grams of the dry polymer to be analyzed in 50 ml. of $CCl_4$ (or take sufficient polymer cement to contain about 1.25 grams of the polymer). Precipitate the polymer by pouring the solution into 400 ml. of isopropyl alcohol with vigorous stirring provided by a Waring Blendor.

(2) Filter the precipitated polymer and squeeze out the excess liquid.

(3) Dissolve the once precipitated polymer from Step 2 in 50 ml. of $CCl_4$, precipitate the polymer again by pouring into 400 ml. of isopropyl alcohol as in Step 1, and filter and remove excess liquid as in Step 2.

(4) Immediately redissolve the twice precipitated undried polymer from Step 3 in about 50 ml. of $CCl_4$ in a Waring Blendor. Filter the solution through glass wool into a 2-ounce narrow-mouthed bottle that can be stoppered to prevent evaporation. Determine the solids content by evaporation of duplicate 5.0 ml. samples of the polymer solution. A hypodermic syringe is convenient for measuring the polymer solutions.

(5) Set the spectrophotometer at the wavelength of 415 m$\mu$.

(6) Check the concentration of the 0.0125 M bromine solution daily before use by determining the absorbance of a known dilution.

(7) To the sample photometer cell, add 1.00 ml. of the 0.2% $HgCl_2$ solution as a catalyst, and 1.00 ml. of the standard 0.0125 M solution of bromine in $CCl_4$.

(8) Prepare a polymer blank by adding to the reference cell 1.00 ml. of the polymer solution from Step 4, 1.00 ml. of $CCl_4$ and 1.00 ml. of the 0.2% $HgCl_2$ solution, shake well, and place the photometer reference cell in the instrument.

(9) Discharge 1.00 ml. of the polymer solution[2] into the photometer cell containing the catalyst and bromine solution from a hypodermic syringe starting the stopwatch the instant of mixing (or the recorder if a recording spectrophotometer is used). Stopper the cell and thoroughly agitate the mixture before placing the cell in the instrument.

(10) Record the 415 m$\mu$ wavelength absorbance of the mixture at one minute intervals. Continue recording time and absorbance values until the faster additional rate of bromine to the double bonds is complete and the slower substitution reaction is well defined. (Usually 10–15 minutes is sufficient.) Prepare a plot from the resulting data of absorbance versus time to obtain an absorbance curve for the analyzed sample.

Calculations (1) Extrapolate the linear portion of the absorbance curve (i.e., the portion for the substitution reaction) for the analyzed sample to zero time,[3] and record the absorbance value for zero time.

(2) Determine the final $Br_2$ concentration by inserting the absorbance value at zero time which was obtained above, and the slope of the calibration curve, in the following equation. The final $Br_2$ concentration, which is the concentration of $Br_2$ at the end of the rapid addition reaction, is then calculated.

Final $Br_2$ concentration in millimoles/liter =

$$\text{Absorbance at zero time} \times \frac{1}{\text{slope of calibration curve}}$$

(3) Calculate the effective unsaturation level as carbon-to-carbon double bonds per 1000 carbon atoms in the polymer from the following equation:

Effective unsaturation level expressed as carbon-to-carbon double bonds per 1000 carbon atoms in the polymer =

$$\frac{(A-B)(C)(14)(100)}{(1000)(D)(E)}$$

where

A = initial $Br_2$ concentration, millimoles/liter
B = final $Br_2$ concentration, millimoles/liter
C = milliliters of solution in the sample photometer cell

---

[1] The spectrophotometer should be adjusted to the wavelength setting of maximum absorption since the bromine absorption curve is very sharp and even small errors in the wavelength setting cannot be tolerated.

[2] The sample size selected will permit analysis of polymers containing 1 to 5 C=C/1000 carbon atoms. Polymers with unsaturation levels above this range can be analyzed but the polymer concentration must be reduced proportionately.

[3] Extrapolation of the absorbance curve for the sample being analyzed gives essentially the same results as extrapolation of a kinetic plot but with a considerable saving in time.

D = percent solids of polymer in the polymer solution (based on the weight of the polymer in grams/volume of the solvent in milliliters)

E = milliliters of the polymer solution in the sample photometer cell.

What is claimed is:

1. In a method of rubberizing fibrous reinforcement for rubbery polymers which includes the steps of applying to the fibrous reinforcement a coating composition comprising an alkaline aqueous solution of a phenolaldehyde resin and a latex of a rubbery polymer, and thereafter drying the coating composition to form a coating including the rubbery polymer which is tightly bonded to the surface of the fibrous reinforcement, the improvement which comprises employing in the coating composition a latex comprising an aqueous dispersion of a rubbery interpolymer which is the product of the interpolymerization of ethylene, at least one straight chain monoolefin containing 3–16 carbon atoms, and at least one polyunsaturated bridged ring hydrocarbon selected from the group consisting of 5-alkylidene-2-norbornenes wherein the alkylidene group contains 1–20 carbon atoms and 5-alkenyl-2-norbornenes wherein the alkenyl group contains 3–20 carbon atoms, the mol ratio of chemically bound ethylene to the chemically bound monoolefin containing 3–16 carbon atoms being between 80:20 and 20:80, and the rubbery interpolymer having a reduced specific viscosity of at least 2.2 and having an effective unsaturation level of at least 5 carbon-to-carbon double bonds per 1000 carbon atoms.

2. The method of claim 1 wherein the coating composition contains carbon black in an amount of about 2–25 parts by weight for each 100 parts by weight of the rubbery interpolymer.

3. The method of claim 1 wherein the straight chain monoolefin containing 3–16 carbon atoms is propylene, the reduced specific viscosity is 2.2–7.0, and the rubbery interpolymer has an effective unsaturation level of 5–60 carbon-to-carbon double bonds per 1000 carbon atoms.

4. The method of claim 3 wherein the phenolaldehyde resin is resorcinol-formaldehyde resin and the bridged ring hydrocarbon is at least one substance selected from the group consisting of 5-ethylidene-2-norbornene, 5-methylene-2-norbornene, 5-(2-methyl-2-butenyl)-2-norbornene, 5-(3-methyl-2-butenyl)-2-norbornene, and 5-(3,5-dimethyl-4-hexenyl)-2-norbornene.

5. The method of claim 3 wherein the bridged ring hydrocarbon is 5-ethylidene-2-norbornene.

6. The method of claim 3 wherein the reduced specific viscosity is 2.5–5 and the rubbery interpolymer has an effective unsaturation level of 6–30 carbon-to-carbon double bonds per 1000 carbon atoms.

7. The method of claim 3 wherein the rubbery interpolymer is the product of the interpolymerization of ethylene, propylene and 5-ethylidene-2-norbornene, the mol ratio of chemically bound ethylene to chemically bound propylene is between 70:30 and 55:45, the reduced specific viscosity is about 2.8–3.5, and the rubbery interpolymer has an effective unsaturation level of about 8–15 carbon-to-carbon double bonds per 1000 carbon atoms.

8. The method of claim 7 wherein carbon black is present in an amount of about 2–25 parts by weight for each 100 parts by weight of the rubbery interpolymer.

9. The rubberized organic reinforcement prepared by the method of claim 1.

10. The rubberized organic reinforcement prepared by the method of claim 4.

11. The rubberized organic reinforcement prepared by the method of claim 7.

12. The rubberized organic reinforcement prepared by the method of claim 8.

13. An article including a body of cured rubbery polymer reinforced with a rubberized organic reinforcement prepared by the method of claim 1, the rubbery polymer comprising the product of the interpolymerization of ethylene, at least one straight chain monoolefin containing 3–16 carbon atoms, and at least one polyunsaturated hydrocarbon, the mol ratio of chemically bound ethylene to the chemically bound monoolefin containing 3–16 carbon atoms being between 80:20 and 20:80, and the rubbery interpolymer initially having an effective unsaturation level of at least 2 carbon-to-carbon double bonds per 1000 carbon atoms.

14. The article of claim 13 wherein the organic reinforcement is prepared by the method of claim 4.

15. The article of claim 13 wherein the organic reinforcement is prepared by the method of claim 7.

16. The article of claim 13 wherein the organic reinforcement is prepared by the method of claim 8.

17. A pneumatic tire comprising a carcass member, the carcass member including a body of cured rubbery polymer reinforced with rubberized tire cord prepared by the method of claim 1, the rubbery polymer in the carcass comprising the product of the interpolymerization of ethylene, at least one straight chain monoolefin containing 3–16 carbon atoms, and at least one polyunsaturated hydrocarbon, the mol ratio of chemically bound ethylene to the chemically bound monoolefin containing 3–16 carbon atoms being between 80:20 and 20:80, and the rubbery interpolymer initially having an effective unsaturation level of at least 2 carbon-to-carbon double bonds per 1000 carbon atoms.

18. The pneumatic tire of claim 17 wherein the tire cord is prepared by the method of claim 4.

19. The pneumatic tire of claim 17 wherein the tire cord is prepared by the method of claim 7.

20. The pneumatic tire of claim 17 wherein the tire cord is prepared by the method of claim 8.

References Cited

UNITED STATES PATENTS

| | | | |
|---|---|---|---|
| 3,093,620 | 6/1963 | Gladding et al. | 260—79.5 |
| 3,151,173 | 9/1964 | Nyce | 260—666 |
| 3,166,517 | 1/1965 | Ro | 252—429 |
| 3,262,482 | 7/1966 | Clifton et al. | 152—330 |
| 3,338,769 | 8/1967 | Kuhlkamp et al. | 156—334 |
| 3,366,508 | 1/1968 | Gallagher | 117—138.8 |
| 3,402,140 | 9/1968 | Bickel et al. | 260—848 X |
| 3,405,754 | 10/1968 | Georges et al. | 152—330 |

HAROLD ANSHER, Primary Examiner

R. A. KILLWORTH, Assistant Examiner

U.S. Cl. X.R.

117—163; 156—334, 335; 161—247, 257